No. 612,354. Patented Oct. 11, 1898.
J. C. LEE.
REEL FOR HARVESTERS.
(Application filed Mar. 28, 1898.)
(No Model.) 3 Sheets—Sheet 1.

WITNESSES:
INVENTOR
ATTORNEYS.

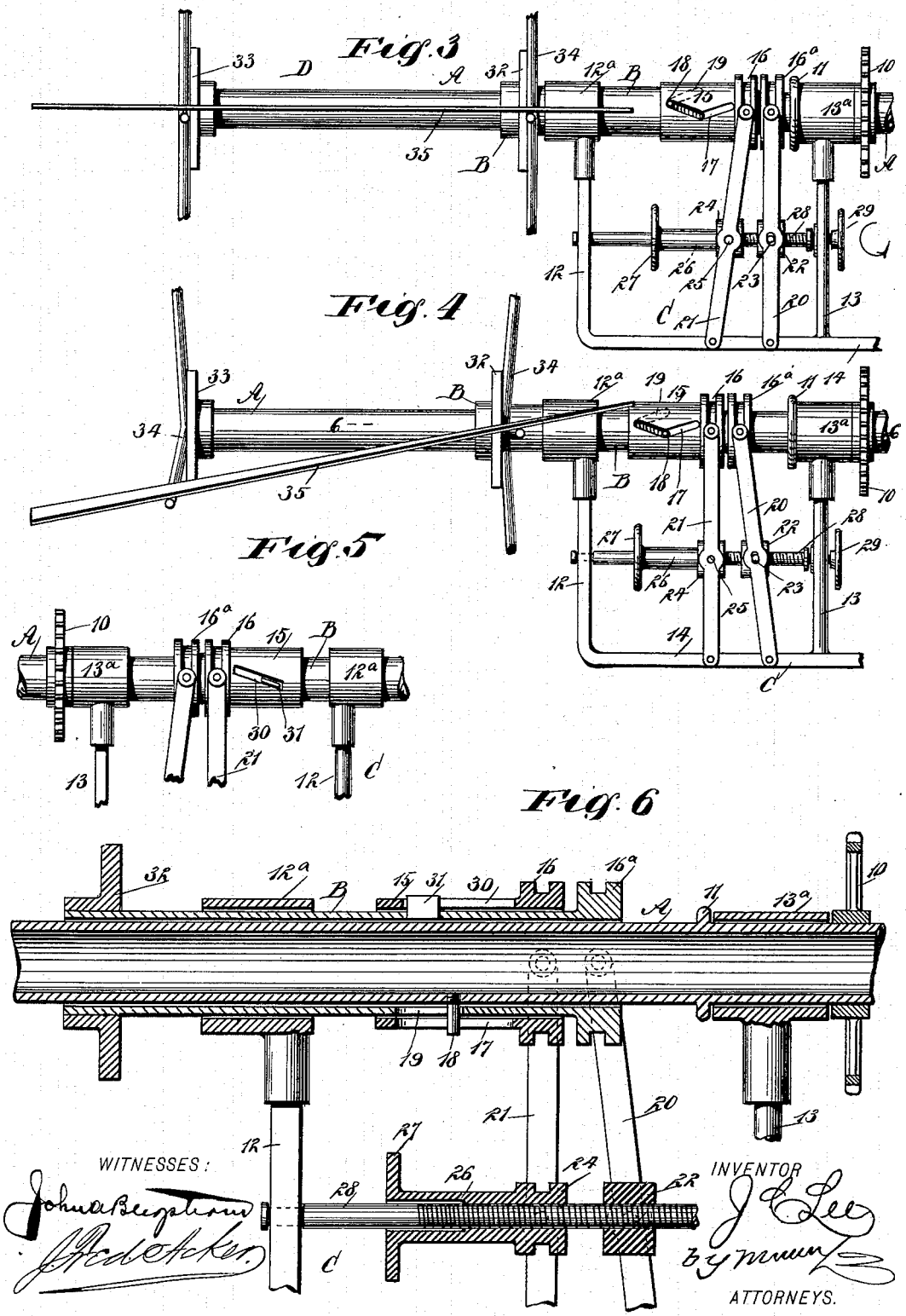

No. 612,354. Patented Oct. 11, 1898.
J. C. LEE.
REEL FOR HARVESTERS.
(Application filed Mar. 28, 1898.)
(No Model.) 3 Sheets—Sheet 3.
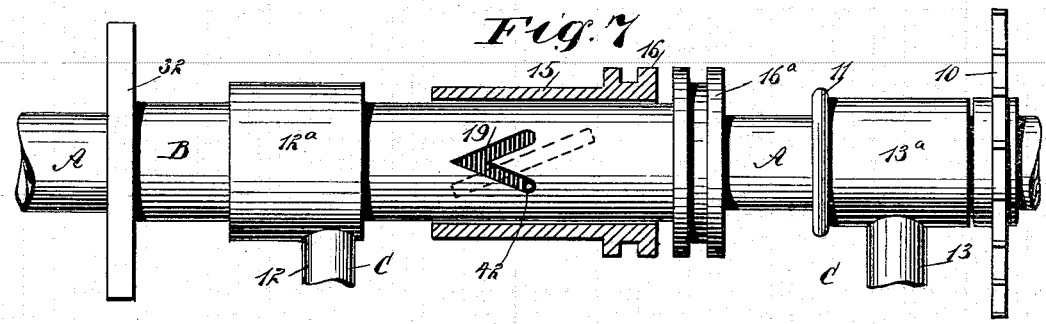
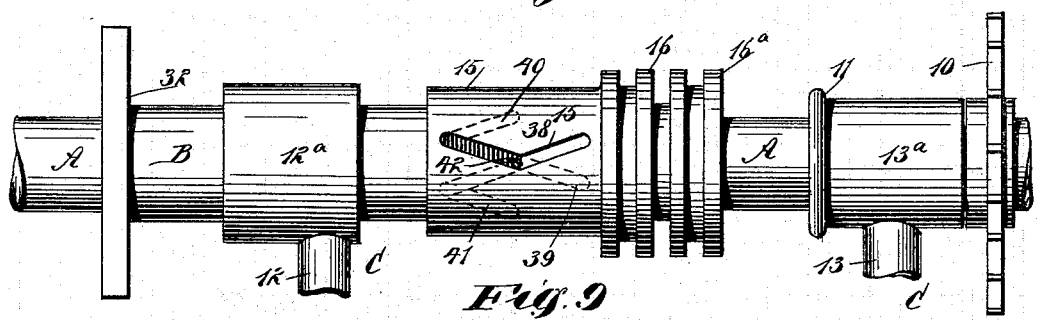
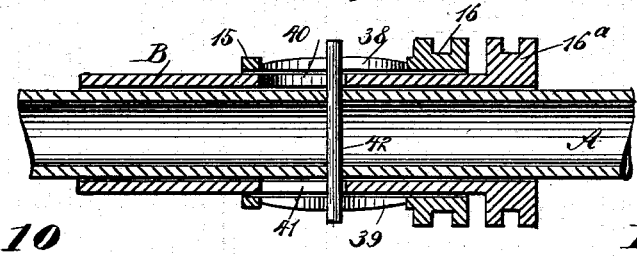
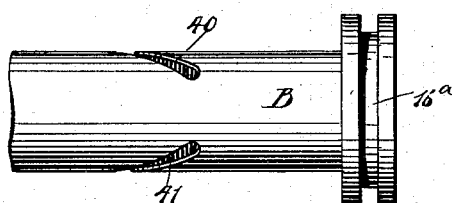
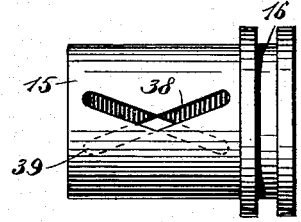
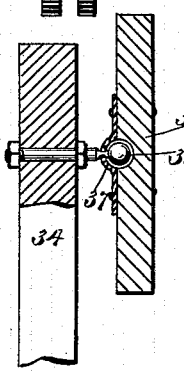
WITNESSES:
INVENTOR
J. C. Lee
BY
ATTORNEYS.

UNITED STATES PATENT OFFICE.

JOHN C. LEE, OF CLIMAX, MINNESOTA.

REEL FOR HARVESTERS.

SPECIFICATION forming part of Letters Patent No. 612,354, dated October 11, 1898.

Application filed March 28, 1898. Serial No. 675,471. (No model.)

*To all whom it may concern:*

Be it known that I, JOHN C. LEE, of Climax, in the county of Polk and State of Minnesota, have invented a new and Improved Reel for Harvesters, of which the following is a full, clear, and exact description.

The object of the invention is to so construct the harvester-reel that the blades may be given any desired lateral or horizontal inclination relative to the reel-shaft, either to the right or to the left, and quickly restored to the usual straight position when necessary.

A further object of the invention is to so construct the reel that it will serve more effectually than reels now in use to bring lodged grain in proper manner on the platform or elevator of a harvester.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
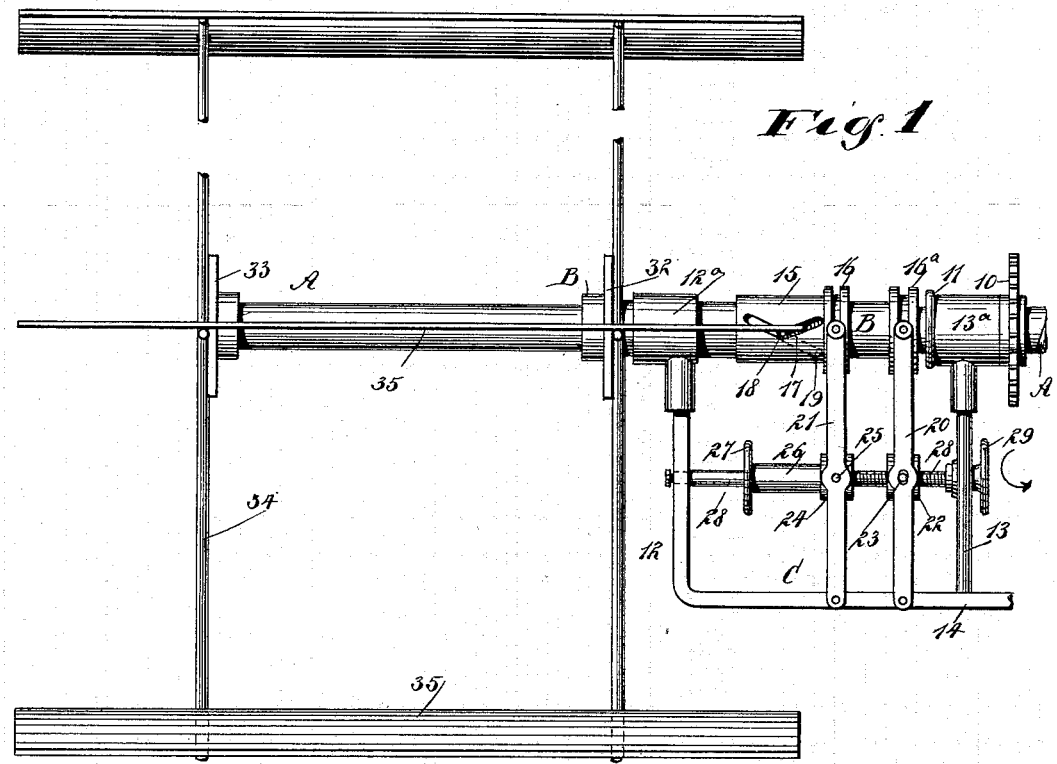
Figure 2:
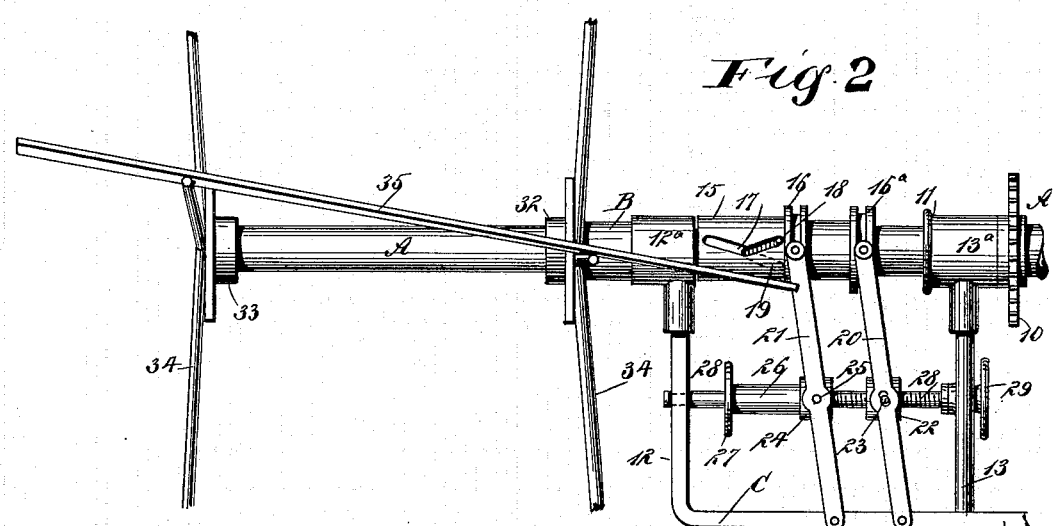

Figure 1 is a side elevation of the improved reel illustrating the blades as straight. Fig. 2 is a side elevation of the reel illustrating the blades as having been given an inclination from right to left. Fig. 3 is a side elevation of the reel showing the blades straight or parallel with the shaft and the adjusting mechanism in position to incline the blades the reverse of the inclination shown in Fig. 2. Fig. 4 is a side elevation of the improved reel illustrating the blades as being inclined from left to right. Fig. 5 is a partial rear view of the adjusting device for the reel. Fig. 6 is a longitudinal vertical section drawn on an enlarged scale and taken practically on the line 6 6 of Fig. 4. Fig. 7 is a side elevation of a portion of the reel-shaft drawn upon an enlarged scale, the adjusting-sleeve upon the shaft being in longitudinal section. Fig. 8 is a side elevation of the shaft and adjusting-sleeve, also drawn upon an enlarged scale, illustrating a slight difference in the construction of the adjusting device for the reel. Fig. 9 is a longitudinal section through a portion of the main and short or sliding sections of the shaft and a longitudinal section through the adjusting-sleeve constructed as shown in Fig. 8. Fig. 10 is a plan view of a portion of the shorter or sliding section of the shaft as used in the form of the device shown in Figs. 8 and 9. Fig. 11 is a side view of the sleeve used in the construction shown in Figs. 8 and 9, and Fig. 12 is a transverse section through one of the blades and a part sectional view of a spoke.

The reel-shaft is in two telescopic sections, including a main section A and a shorter section B, mounted to slide on the main section. At one end of the main section A the driving wheel or pulley 10 of the shaft is secured, and adjacent to this pulley a collar 11 is formed on the main section of the shaft. A frame C serves as a support for the shaft, the frame comprising usually two uprights 12 and 13, connected by a lower bar 14, the upright 12 being provided with a bearing $12^a$, which is loosely carried around the outer section B of the shaft, while the upright 13 is provided with a like bearing $13^a$, loosely mounted on the main section A of the shaft between the collar 11 and the driving-wheel 10, as shown best in Figs. 6 and 7. A sleeve 15 is held to slide on the outer and shorter section B of the reel-shaft, and the sleeve 15 at one of its ends is provided with a peripherally-grooved flange 16, while a corresponding flange $16^a$ is formed upon the end of the outer section B of the shaft, the two peripherally-grooved flanges being somewhat near each other.

At the front of the sleeve 15 a slot 17 is produced longitudinally therein, the slot comprising two members connected together in a manner to resemble a V, as shown in Figs. 1, 2, 3, and 4. A pin 18 is secured to the main section A of the reel-shaft, as illustrated in Fig. 6, which pin extends out through the slot 17 in the sleeve 15 and likewise through a V-slot 19, made in the outer shorter section B of the shaft, the members of the V-slot 19 being adapted for registry with the members of the sleeve-slot 17 at periods during the end movement of the sleeve. The two arms of the V-slot 19 in the shaft are at a more acute angle to each other than are the arms of the slot 17 in the sleeve.

Two levers 20 and 21 are pivoted to the lower bar 14 of the frame C, which levers are forked at their upper ends and pivotally connected with the grooved portions of the flanges 16 and 16ª, a lever being provided for each flange. The levers are provided with chambers at or near their centers, and in the chamber of the lever 20 a nut 22 is pivoted, trunnions 23 from the nut being passed through slots in the sides of the lever. Another nut 24 is provided for the lever 21, being located in the chamber of that lever, and pins 25, attached to the lever, are made to enter a groove in the nut 24. The nut 24, as shown in Fig. 6, is provided with a hub 26, and a thumb-wheel 27 is formed on the hub. A screw-shaft 28 is journaled in the uprights of the frame C, the said shaft passing through both of the nuts 22 and 24 and loosely through the hub 26 of the nut 24. The shaft 28 at one of its ends is provided with a hand-wheel 29, by means of which it is revolved. In the back of the sleeve 15 an inclined slot 30 is made, which receives a projection 31, carried from the shorter and outer section B of the shaft, the projection 31 and slot 30 serving as guides for the said sleeve 15.

The reel D consists of two heads 32 and 33, the head 32 being secured firmly upon the inner end of the outer or shorter section B of the shaft, while the head 33 is secured firmly upon an end of the main section A of the shaft, as shown in Figs. 1, 2, 3, and 4. Spokes 34 are projected from the heads 32 and 33, and blades 35 are connected with corresponding spokes by means of balls 36, which are carried by the spokes and turn in sockets 37, secured upon the blades, as shown in Fig. 12.

In operation when the sleeve 15 is adjusted on the reel-shaft, so that the pin 18 will be at the point of juncture of the two members of the slots 17 in said sleeve, as shown in Fig. 1, the pin will have entered one member of the V-slot 19 in the shorter section of the reel-shaft, the parts will be in the position shown in Fig. 1, and the blades of the reel will be parallel with the reel-shaft. Upon turning the screw-shaft 28 toward the operator, or as shown by the arrow in Fig. 1, the levers will be carried in direction of the reel, as shown in Fig. 2, and the pin will travel up the right-hand member of the slot 17, whereupon the main section A of the shaft will be turned toward the right and the shorter section B of the reel will slide or have end movement on the end section in a manner to slightly shorten the distance between the heads of the reel, thus imparting to the blades the inclination shown in Fig. 2. The blades may be again straightened by reversing the movement of the screw-shaft 28. If it be desired to give the blades an opposite inclination to that shown in Fig. 2, the blades are straightened, restoring the parts to the position shown in Fig. 1, and the thumb-wheel 27 is turned, causing a movement on the part of the lever 21 only, and a sliding movement of the sleeve 15 in a direction that will bring the pin 18 at the end of the other member in the slot 17 of the sleeve, at which time the parts will be in the position shown in Fig. 3. To give the desired inclination to the blades, the screw-shaft is turned, as before, in direction of the arrow shown in Fig. 3, and the main section of the shaft will be turned to the left, as before, while the movement of the shorter section of the shaft will be the same as before, bringing the various parts to the position shown in Fig. 4.

The construction of the shifting device shown in Figs. 8, 9, 10, and 11 differs but very slightly from the construction of the adjusting device shown in the other figures; but the construction shown in said Figs. 8, 9, 10, and 11 is preferable for various reasons. The sleeve 15 under the construction shown in Figs. 8, 9, and 11 is provided at both of its sides with an angular or V slot, said slots being designated, respectively, as 38 and 39, the rear slot 39 taking the place of the guide-slot 30 and guide-pin 31. (Shown in Fig. 5.) The slots 38 correspond to the slots 17 shown in Figs. 1, 2, 3, and 4; but the arms of the slot 39 are made to extend downward, while the arms of the slot 38 extend upward, and the points of juncture of the arms of both slots are in diametrical alinement, as is particularly shown in Figs. 8 and 11. The sliding or shorter section B instead of being provided with a single V-shaped slot, as shown in Fig. 7, is provided with two opposing V-shaped slots 40 and 41, extending longitudinally of the shaft, as is best illustrated in Fig. 10. A pin 42, which corresponds to the pin 18 in Figs. 1, 2, 3, and 4, is passed through the main section A of the shaft and through both of the V-slots 40 and 41 and likewise through the opposing slots 38 and 39 in the sleeve 15. The operation of the device constructed as shown in Figs. 8, 9, 10, and 11 is identical with that of the device constructed as shown in Figs. 1, 2, 3, and 4.

Having thus described my invention, I claim as new and desire to secure by Letters Patent—

1. In a harvester-reel, a shaft for the reel, comprising two telescopic sections, the exterior section having substantially V-shaped slots, one at the front and one at the rear, a sleeve on said exterior section having opposite angular slots, the arms of one slot being inclined upward from the center and the arms of the other slot being inclined downward from the center, and a pin extended from the interior section of the shaft into all of the slots, substantially as specified.

2. In a harvester-reel, a shaft consisting of two telescopic sections, the exterior section having a V-shaped slot, a reel-head mounted on each section of the shaft, blades carried thereby, a sleeve mounted on the exterior section and having a V-shaped slot, the angle of which differs from that of the slot in the shaft-section, a pin extended from the interior section of the shaft into said slots, and means for operating the sleeve, substantially as specified.

3. The combination, with a shaft constructed in telescopic sections and a reel carried by the shaft, the reel consisting of two heads each of which is secured to a section of the shaft, and blades pivotally carried by said heads, of a sleeve mounted upon one section of the shaft and provided with an angular slot which receives a projection from the other section of the shaft, a shifting lever connected with the shaft-section carrying the sleeve, and a shifting lever for the sleeve, whereby the sleeve may have movement on the shaft-section independent of said section, as set forth.

JOHN C. LEE.

Witnesses:
   C. F. GETCHELL,
   H. B. LANAGER.